(12) United States Patent
Schrader et al.

(10) Patent No.: US 7,308,041 B1
(45) Date of Patent: Dec. 11, 2007

(54) METHOD AND TRANSMITTER FOR TRANSMITTING RADIO SIGNALS

(75) Inventors: Marc Schrader, Hannover (DE); Nabil Hentati, Hannover (DE)

(73) Assignee: Robert Bosch GmbH, Stuttgart (DE)

( * ) Notice: Subject to any disclaimer, the term of this patent is extended or adjusted under 35 U.S.C. 154(b) by 1225 days.

(21) Appl. No.: 10/088,218

(22) PCT Filed: Sep. 2, 2000

(86) PCT No.: PCT/DE00/03020

§ 371 (c)(1),
(2), (4) Date: Jul. 24, 2002

(87) PCT Pub. No.: WO01/22673

PCT Pub. Date: Mar. 29, 2001

(30) Foreign Application Priority Data

Sep. 17, 1999 (DE) .................. 199 44 558

(51) Int. Cl.
*H04K 1/02* (2006.01)
*H04L 25/03* (2006.01)
*H04L 25/49* (2006.01)

(52) U.S. Cl. ..................... 375/296; 375/285

(58) Field of Classification Search ............... 375/224, 375/225
See application file for complete search history.

(56) References Cited

U.S. PATENT DOCUMENTS

| | | | | |
|---|---|---|---|---|
| 3,577,165 A | * | 5/1971 | Helliwell et al. | 327/100 |
| 4,615,040 A | * | 9/1986 | Mojoli et al. | 375/267 |
| 5,262,734 A | * | 11/1993 | Dent et al. | 330/52 |
| 5,384,547 A | | 1/1995 | Lynk et al. | |
| 5,486,789 A | * | 1/1996 | Palandech et al. | 330/149 |
| 5,524,286 A | * | 6/1996 | Chiesa et al. | 455/126 |
| 5,598,436 A | * | 1/1997 | Brajal et al. | 375/297 |
| 5,732,333 A | * | 3/1998 | Cox et al. | 455/126 |
| 6,125,266 A | * | 9/2000 | Matero et al. | 455/126 |
| 6,166,601 A | * | 12/2000 | Shalom et al. | 330/151 |
| 6,265,949 B1 | * | 7/2001 | Oh | 332/103 |

FOREIGN PATENT DOCUMENTS

| | | |
|---|---|---|
| DE | 44 41 323 | 5/1996 |
| EP | 0 735 731 | 10/1996 |
| EP | 0 743 768 | 11/1996 |

OTHER PUBLICATIONS

Lampe M. et al: "Reducing Out-Of-Band Emissions Due to Nonlinearities in Ofdm Systems", *1999 EEE 49th Vehicular Technology Conference. Moving Into a New Millenium*, Houston TX, United States, May 16-20, 1999.

* cited by examiner

*Primary Examiner*—Jean B. Corrielus
(74) *Attorney, Agent, or Firm*—Kenyon & Kenyon LLP

(57) ABSTRACT

A method of transmitting wireless signals and a transmitter for transmitting wireless signals for optimally operate an amplifier of a transmitter in its linear range, signals being transmitted in orthogonal frequency division multiplexing (OFDM). The amplitudes of the OFDM signals that lie above a predefined threshold are eliminated using an additive correction signal, the phase of the OFDM signals being impressed on the additive correction signal. Furthermore, a correction signal is formed and subtracted from the OFDM signals, until there are no more amplitudes of the OFDM signal above the predefined threshold. Gauss pulses are used as correction signals due to their simple handling. Oversampling of the OFDM signals determines the amplitude values of the OFDM signals.

12 Claims, 2 Drawing Sheets

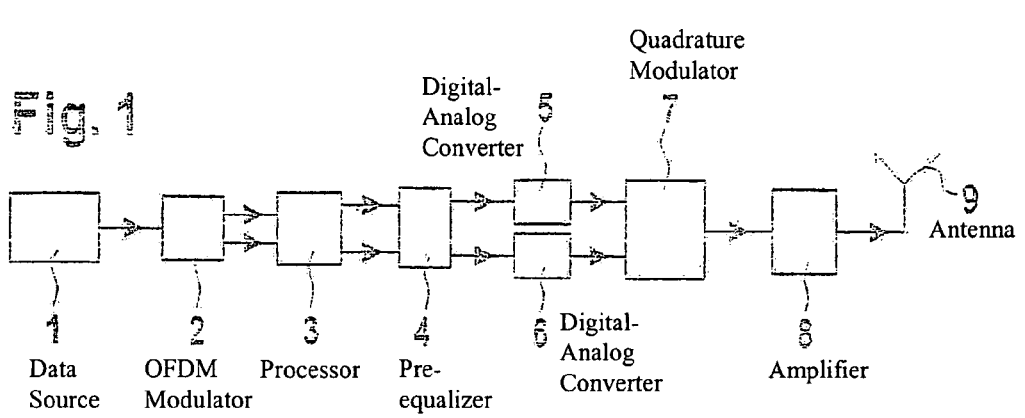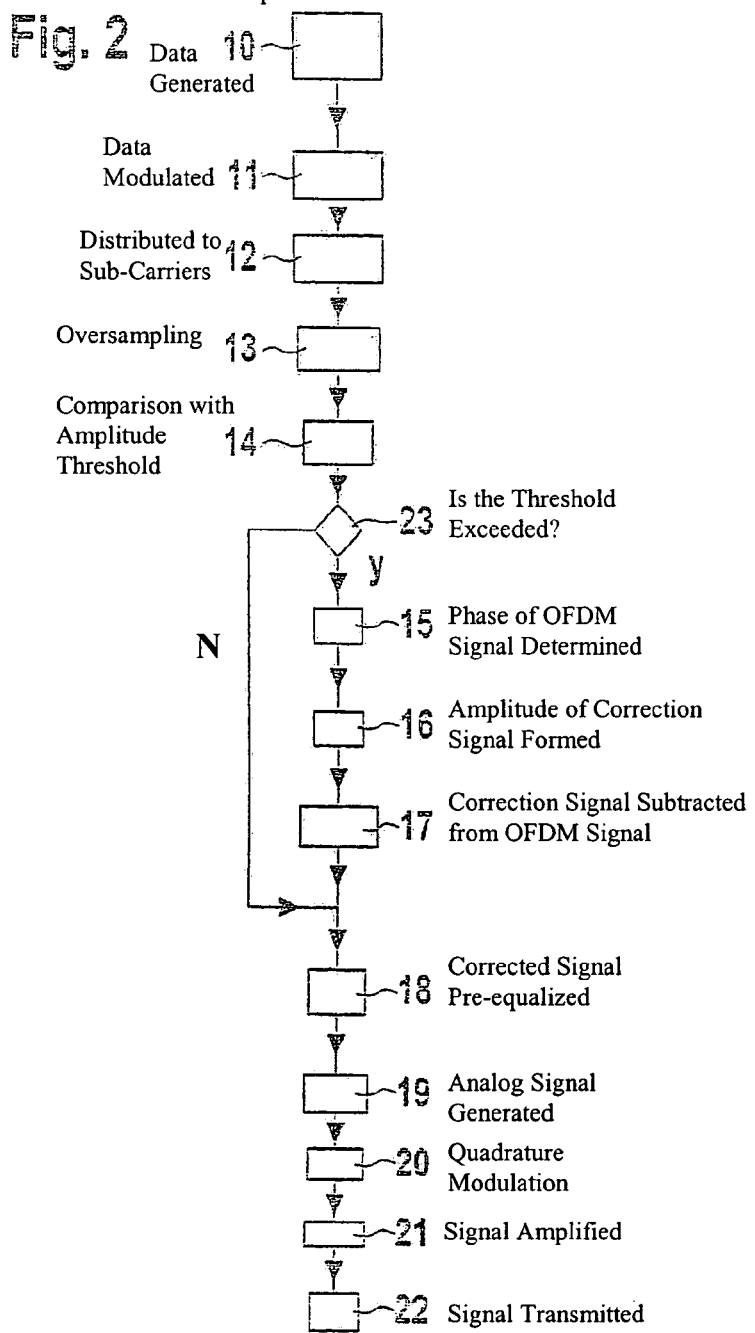

METHOD AND TRANSMITTER FOR TRANSMITTING RADIO SIGNALS

This is a National Stage of International Application No. PCT/DE00/03020, filed on Sep. 20, 2000, and claims priority under 35 U.S.C. § 119 to German Patent Application No. 199 44 558.3, filed Sep. 17, 1999.

FIELD OF THE INVENTION

The present invention relates to a method for transmitting wireless signals and a transmitter for transmitting wireless signals, respectively.

BACKGROUND INFORMATION

M. Lampe and H. Rohling: "Aufwandsgünstige Verfahren zur Reduktion der Außerbandstrahlung in OFDM-Funkübertragungssystemen" [Cost-Effective Method for Reduction of the Out-Of-Band Radiation in OFDM Wireless Transmission Systems], a lecture given at the OFDM technical conference in Braunschweig on Sep. 3, 1989, printed in the proceedings of the conference, refers to a transmitter for transmitting OFDM (orthogonal frequency division multiplexing) signals, in which a reduction of the amplitude variance reduces out-of-band radiation caused by the nonlinearity of the transmitter, by subtracting an additive correction signal from the OFDM signal to be transmitted. The correction signal is the difference between a predefined threshold and the amplitude values of the OFDM signal that lie above the threshold. If the amplitude of the OFDM signal is less than the threshold at a specific instant, then the amplitude of the correction signal at the specific instant is zero.

A method for correction of the amplitude variance is discussed in European Published Patent Application No. 735 731, in which generated partial signals are added with different signs, depending on amplitude statistics. In this manner, intervention in the coding is achieved. The additional information should be transmitted to the receiver, where it should be decoded. European Published Patent Application No. 743 768 discusses an envelope of a signal, which comprises many different signals, each modulated with frequency shift keying, being reduced by phase shift of these individual signals.

SUMMARY OF THE INVENTION

It is believed that an exemplary method and transmitter according to the present invention have an advantage in that the phase of the OFDM signal to be corrected is also impressed onto the correction signal, so that a bit error rate of the OFDM signal and thus the signal quality improve. In this manner, an expensive transmitter for OFDM signals may be modulated and utilized better.

Furthermore, a less expensive transmitter may be used for a predefined transmitter power, since the amplifier of the transmitter is utilized better.

The correction signal may be repeatedly determined and subtracted from the already corrected signal. In this manner, the influence of the correction signal on the OFDM signal may be minimized. Through such iteration, other signal components, which are enhanced by the correction signal, may be reduced again.

Furthermore, the correction signal may be composed of Gauss pulses. Gauss pulses have the same shape in both the time and frequency domains, and propagation of a Gauss pulse in the time domain results in propagation of a Gauss pulse in the frequency domain. In this manner, the handling and composition of the correction signal may be simplified.

In addition, the correction signal may be iteratively determined repeatedly and subtracted from the OFDM signal, until the OFDM signal no longer exceeds a predefined threshold. In this manner, an iterative method may prepare the OFDM signal optimally for a given amplifier of the transmitter to optimally utilize the dynamics of the amplifier, without out-of-band radiation occurring.

Alternatively, according to an exemplary method of the present invention, how long the correction signal is determined and subtracted from the OFDM signal may be preset with experimental values. This refinement may simplify iteration of the correction of the OFDM signal.

Furthermore, oversampling may be performed on the OFDM signal before the correction is performed. In this manner, the amplitudes occurring in the OFDM signal may be established, since oversampling provides a more exact resolution of the OFDM signal to be corrected.

BRIEF DESCRIPTION OF THE DRAWINGS

FIG. 1 shows a transmitter for transmitting OFDM signals.

FIG. 2 is a block diagram of the steps of an exemplary method according to the present invention for reducing the amplitude variance in OFDM signals.

DETAILED DESCRIPTION

Figure 3:
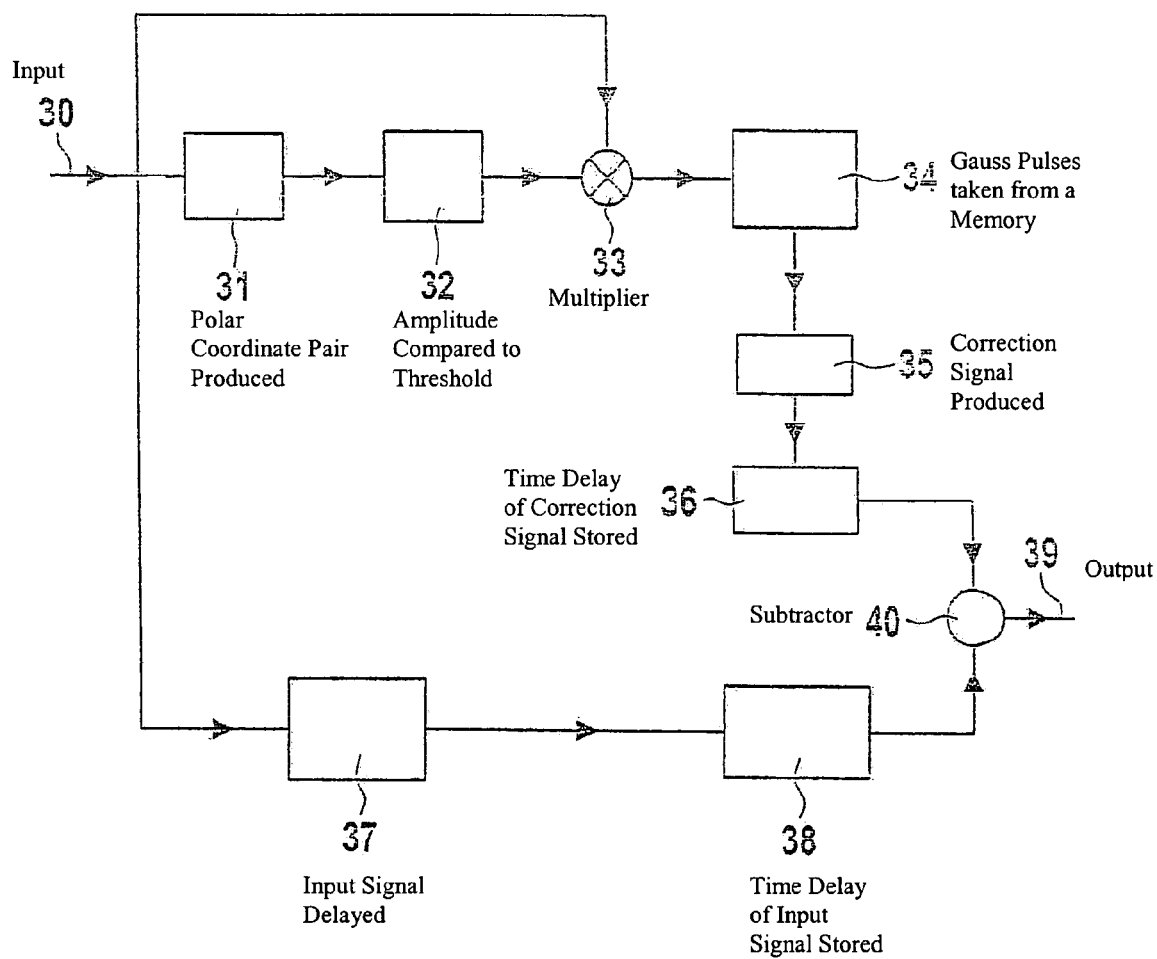
FIG. 3 is a block diagram of the steps of an exemplary method according to the present invention for correcting the OFDM signals in a processor.

Orthogonal frequency division multiplexing (OFDM) is a method used for mobile wireless applications. In OFDM, the signals to be transmitted are distributed to many sub-carriers, these sub-carriers having a specific frequency interval relative to one another, so that the signals distributed to the sub-carriers do not mutually interfere. This behavior is described as orthogonal.

OFDM is therefore used for digital broadcast transmission methods. These include DAB (Digital Audio Broadcasting), DVB (Digital Video Broadcasting), and DRM (Digital Wireless Mondial). These broadcast transmission methods benefit from OFDM because only a small part of the broadcast signal transmitted is interfered with when a frequency-selective damping occurs, since the broadcast signal is distributed in multiple frequencies, and only one part of the signal is interfered with, which is transmitted on a frequency at which a strong damping occurs. The part of the signal interfered with is corrected by error detection and correction measures. These error correction measures may include error correction codes, such as block codes or convolution codes.

In OFDM, summation in the time domain of the distributed signals occurs after the distribution of the signals to be transmitted to the sub-carriers, with the amplitudes being added, so that the amplitudes of the superimposed signals assume such a large value at specific instants that the amplifier of the transmitter is driven into its nonlinear range, so that frequency components outside the predefined frequency spectrum may arise. This may occur if the signals distributed to the individual sub-carriers constructively superimpose. Constructive superposition occurs if the phases of the signals are equal.

If a signal, which is transmitted at a specific frequency, is given on a nonlinear characteristic curve, such as, for example, that of an amplifier, frequency components arise at multiples of the specific frequency. If these multiples are outside the transmission frequency spectrum, they are referred to as out-of-band radiation, since the signal energies outside the available spectrum are transmitted and lost for signal transmission because a receiver filters out the out-of-band radiation. In addition, the out-of-band radiation interferes with other transmission systems operating at the frequencies at which the out-of-band radiation occurs.

If new frequency components are present within the transmission frequency spectrum available, undesired signal components are demodulated in the receiver. Crosstalk may therefore occur. The signal quality and therefore the bit error rate of the signal received may be worsened thereby. The bit error rate indicates the number of bits detected incorrectly per bit received. To determine the bit error rate, error detection codes may be used. The OFDM signal is thus like a noise signal on the sub-carriers, after the distribution of the signals to be transmitted, with individually occurring amplitude peaks driving the amplifier of the transmitter into the nonlinear range.

The ratio of amplitude peaks during a signal to the average amplitude of the signal is defined as the crest factor. Therefore, minimizing the crest factor drives the amplifier of the transmitter only in the linear range, thus utilizing it optimally.

A transmitter for transmitting OFDM signals is shown in FIG. 1. Data to be transmitted is generated in a data source 1. Data source 1 may be, for example, a microphone. Microphone 1 converts voice signals into electrical signals, and the signals are amplified, coded, and digitized. The digital signals are then transferred as a bit stream to an OFDM modulator 2. The amplification, coding, and digitization are performed by a signal processor, which is connected to microphone 1.

OFDM modulator 2 first performs a differential phase modulation of the signals to be transmitted. For this purpose, differential quadrature phase shift keying (DQPSK) may be used. DQPSK is digital modulation, in which the phase shift of the signal is modulated, for example, the phase shift in a specific time interval, that is, per bit, may be used as a modulation signal or a phase shift of ±90° may be used. Differential modulation methods do not require an absolute value to be established in the receiver to demodulate signals, since the information transmitted is contained in the phase shift of the signals transmitted. A bit sequence of 110 thus leads to a phase shift of +90° for each for the two ones and −90° for the zero.

In addition to DQPSK, other differential phase modulation methods and further digital modulation methods may also be used, such as Quadrature Amplitude modulation (QAM), in which both the phase and amplitude are modulated, and other types of phase shift keying (PSK).

DQPSK is a complex modulation method, since the bits of the bit stream, which are fed into OFDM modulator 2, are mapped onto phase changes. If a phase of the signal is changed, a complex plane is used for the graphic representation of the signals as vectors, with a real part being plotted on the abscissa and an imaginary part on the ordinate. A signal having a phase greater than zero is rotated around this phase counterclockwise outward from the abscissa in the complex plane.

According to differential QPSK, OFDM modulator 2 performs the distribution of the signals to be demodulated to the sub-carriers, so that an OFDM signal arises. Since a complex signal arises as a consequence of the DQPSK, which OFDM modulator 2 performs, a first and a second data output from OFDM modulator 2 are connected to a first and second data input of a processor 3, to process two parts of the signal, that is, the imaginary and real parts, separately.

Processor 3 first performs oversampling of the complex signal received from OFDM modulator 2. Experimental values indicate that at least sampling may be necessary to recognize the amplitude peaks with a high probability. With less sampling, an amplitude peak value may lie between two sampled values.

After oversampling, processor 3 compares the sampled values with a threshold, which is predefined and stored in the transmitter. The threshold determines which amplitudes are too high and therefore which ones would drive the amplifier into the nonlinear range. If a sampled value is greater than the predefined threshold, a difference between the sampled value and the threshold is produced. The correction signal receives the difference as the amplitude for the instant at which the sampled value is greater than the threshold. If the sampled value is equal to or less than the threshold, the correction signal receives an amplitude of zero for the instant.

In a block diagram, FIG. 3 shows a cycle that processor 3 performs to establish the correction signal and subtract it from the OFDM signal to be corrected. The sampled values are applied as complex values to input 30 of the block diagram. In block 31, a polar coordinate pair is produced by a table of Cartesian coordinates that describe the complex number of the OFDM signal, so that the amplitude of the OFDM signal may be established. Since the complex OFDM signal includes an imaginary part and a real part, that is, Cartesian coordinates, only the coordinates of the complex number exist in a coordinate system, with the abscissa indicating the real part and the ordinate indicating the imaginary part. However, for a comparison between the threshold and amplitude of the OFDM signal, an absolute value of the complex number is required. The absolute value, however, is the square root of the sum of the individual squares of the coordinate values, that is, of the real part and of the imaginary part, and therefore is the length of a vector from the origin of the coordinate system to the coordinates of the complex number that describes the signal.

In addition, the phase of the OFDM signal is established, since the phase is impressed onto the correction signal for the instant to enhance the quality of the corrected OFDM signal. The conversion from Cartesian coordinates into polar coordinates provides both the absolute value of the complex OFDM signal and the phase. The phase of the complex OFDM signal is the angle from the abscissa to the vector of the OFDM signal, with measurement being performed counterclockwise. The CORDIC algorithm assigns the Cartesian coordinates to polar coordinates using a table. The amplitude and therefore the absolute value of the complex OFDM signal are compared in block 32 with a predefined threshold. If the absolute value of the complex OFDM signal is below the threshold, the output signal, and therefore the correction signal, is set to zero. If the absolute value of the complex OFDM signal is above the threshold, the difference between the threshold and the absolute value provides the amplitude of the correction signal.

Input signal 30 is multiplied by the output signal of block 32 by a multiplier 33. If the absolute value of the complex OFDM signal is over the threshold, the product is greater than zero, otherwise it is zero. In block 34, Gauss pulses for the real part and for the imaginary part are taken from a memory with the evaluated input signal 30. In subsequent block 35, a complex number and therefore a complex correction signal are produced from the Gauss pulses for the real part and for the imaginary part. Furthermore, the complex correction signal is delayed by a time T2, with time T2 being predefined. The time thus delayed is stored in block 36. Original input signal 30 is delayed in block 37 by predefined time T1 to be stored in memory 38. Times T1 and T2 results in the OFDM signal for which the correction signal is established and the correction signal being stored at the same time in blocks 36 and 37.

A complex subtraction is performed by subtracter 40, so that the OFDM signal is corrected around its amplitude peaks, with the phase of the signal being taken into consideration during the subtraction by retaining the real and imaginary parts for the correction signal. The corrected signal is output signal 39.

Processor 3 performs the correction described above, until no amplitude of the complex OFDM signal is still over the threshold value. Specifically, the correction signal may result in amplitude values that were originally below the threshold being elevated over the threshold by the weighting with the correction signal. Alternatively, the correction algorithm may be performed for a predefined number of repetitions.

In pre-equalizer 4, the corrected complex OFDM signal is pre-equalized according to the characteristic curve of an amplifier 8 of the transmitter by multiplying it by the reciprocal value of the characteristic curve of amplifier 8. After the pre-equalization, the real part and the imaginary part of the signal are each converted into an analog signal by digital-analog converters 5 and 6.

The complex OFDM signal is converted into a real signal and transposed into an intermediate frequency range with a quadrature modulator 7. At the same time, the complex signal, which is mathematically described by $x(t)=a(t)+jb(t)$, is transformed into a real signal and into the intermediate frequency range by $y(t)=a(t)\cos(\omega t)-b(t)\sin(\omega t)$. In this case, $\omega$ is a frequency shift into the intermediate frequency range generated by an oscillator connected with quadrature modulator 7.

Amplifier 8 of the transmitter amplifies the signals received from the quadrature modulator, and the amplified signals are transmitted by an antenna 9.

FIG. 2 shows a method for reducing the amplitude variance in OFDM signals. Amplitude variance concerns the behavior of OFDM signals, in which the amplitude widely changes, due to the superposition of the signals distributed to the individual sub-carriers.

The data is generated in method step 10. This may occur, for example, as described above. In method step 11, the data generated is modulated using differential phase modulation, with DQPSK being used in this exemplary embodiment. In method step 12, the modulated signals are distributed to the sub-carriers, so that an OFDM signal is created. In method step 13, the OFDM signal is subjected to oversampling, so that a set of sampled values are created, which are compared in method step 14 with the threshold for the amplitude. This comparison is examined in method step 23. The procedure continues with method step 15, if an amplitude is over the threshold, and, if no amplitude is over the threshold, the procedure continues with method step 18.

Method step 15 determines the phase of the OFDM signal. In method step 16, the amplitude of a correction signal is formed from the difference of amplitude values that lie over the threshold and impressed onto the associated phase of the OFDM signal. At the instants at which the amplitude values of the OFDM signal lie below the threshold, the amplitude of the correction signal is set to zero. In method step 17, the correction signal is subtracted from the OFDM signal, so that the correction is performed. In method step 18, the corrected signal is pre-equalized according to the inverse characteristic curve of amplifier 8. In method step 19, an analog signal is generated from the digital pre-equalized signal, so that no signal components exist at frequencies which lie outside the transmission frequency spectrum. In method step 20, the quadrature modulation is performed to transpose the analog signal into the transmission frequency domain. In method step 21, the transposed signal is amplified and transmitted in method step 22 by antenna 9.

The correction may be performed in the base band. The baseband is the frequency range in which, for example, voice signals may be present directly after the acoustic electric conversion. However, an exemplary method according to the present invention may be performed in an intermediate frequency range. For this purpose, a Hilbert transform of the signals should be performed after the sampling and a Hilbert back transform should be performed after the subtraction of the correction signal from the original signal.

For this purpose, a signal, which is already present in an intermediate frequency range and is described by $x(t)=a(t)\cos(\omega t)$, is converted into a complex signal by $y(t)=a(t)\cdot e^{j\omega t}$. The Hilbert back transform, after performing an exemplary method according to the present invention, occurs by formation of the real part of the complex signal.

What is claimed is:

1. A method for transmitting a wireless signal using orthogonal frequency division multiplexing, the method comprising:
    modulating the wireless signal using digital phase modulation;
    sampling the wireless signal after modulation to generate a plurality of sampled values of the modulated wireless signal;
    determining at least one amplitude value of the wireless signal using the plurality of sampled values;
    comparing the at least one amplitude value to a predefined threshold to obtain a correction signal;
    determining a phase of the wireless signal;
    providing the correction signal with the phase of the wireless signal;
    subtracting the correction signal from the wireless signal after providing the correction signal with the phase of the wireless signal to reduce the amplitude values of the wireless signal that lie above the predefined threshold to a value of the threshold to generate a corrected wireless signal;
    pre-equalizing the corrected wireless signal;
    converting the pre-equalized wireless signal into an analog wireless signal using at least one digital-analog converter;
    amplifying the analog wireless signal; and
    transmitting the amplified wireless signal.

2. The method of claim 1, wherein the correction signal is subtracted from the wireless signal a plurality of times, the correction signal being re-determined for each subtraction.

3. The method of claim 2, wherein the correction signal includes Gauss pulses.

4. The method of claim 2, wherein the correction signal is subtracted from the wireless signal, until the amplitudes of the corrected wireless signal are at most equal to the predefined threshold.

5. The method of claim 2, wherein a number of times the correction signal is to be subtracted from the wireless signal is predefined.

6. The method of claim 4, wherein the wireless signal is oversampled.

7. A transmitter for transmitting a digital signal, the transmitter comprising:
- a modulator to perform orthogonal frequency division multiplexing (OFDM) and a phase modulation on the digital signal to be transmitted to form a modulated OFDM signal;
- a processor to sample the modulated OFDM signal to generate a plurality of sampled values, determine at least one amplitude value of the modulated OFDM signal, compare the at least one amplitude value of the modulated OFDM signal to a predefined threshold to form a correction signal, determine a phase of the sampled modulated OFDM signal, provide the correction signal with the phase of the modulated OFDM signal, and subtract the correction signal from the modulated OFDM signal after providing the correction signal with the phase of the modulated OFDM signal to reduce the amplitude values of the modulated OFDM signal that lie above the predefined threshold to a value of the threshold to output a corrected modulated OFDM signal;
- a pre-equalizer to pre-equalize the corrected modulated OFDM signal to output a pre-equalized corrected modulated OFDM signal; and
- at least one digital/analog converter to convert the pre-equalized corrected modulated OFDM signal into an analog signal.

8. The transmitter of claim 7, wherein the processor is configured to subtract the correction signal from the modulated OFDM signal a plurality of times and to re-determine the correction signal for each subtraction.

9. The transmitter of claim 8, wherein the processor is configured to subtract the correction signal, until the amplitudes of the corrected modulated OFDM signal are at most equal to the predefined threshold.

10. The transmitter of claim 8, wherein the processor is configured to subtract the correction signal from the modulated OFDM signal a number of times indicated by a predefined value.

11. The transmitter of claim 9, wherein the processor is configured to generate the correction signal, and the correction signal includes Gauss pulses.

12. The transmitter of claim 11 wherein the processor is configured to perform oversampling on the modulated OFDM signal.

* * * * *